Nov. 21, 1933.  L. W. CHILD  1,936,379
BEARING
Filed March 2, 1932
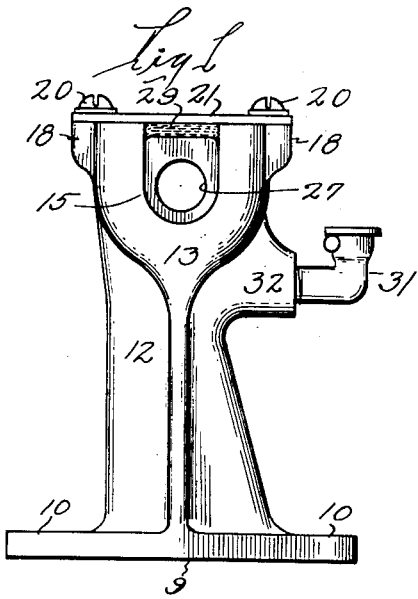
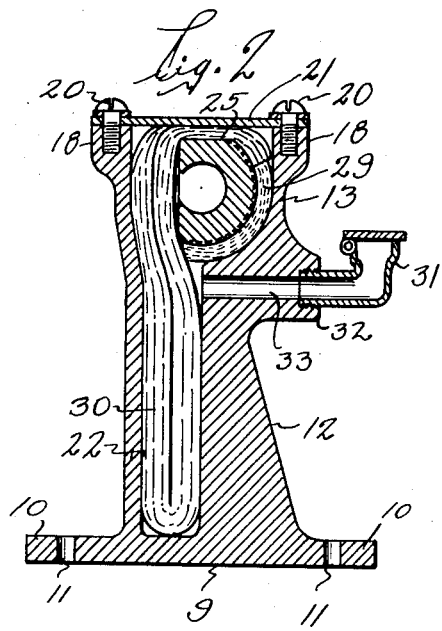
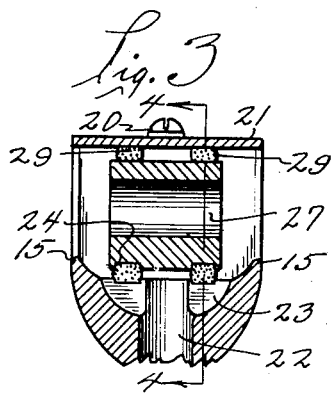
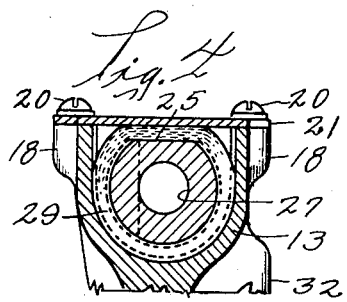
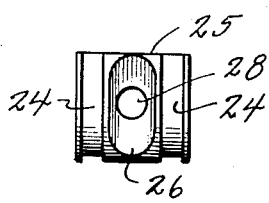
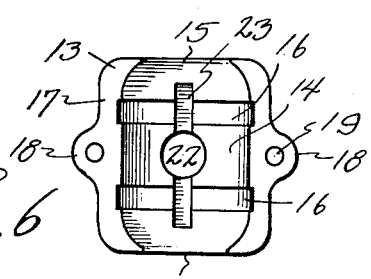
Inventor
Lachlan W. Child
By Lynn H. Latta
Attorney Patented Nov. 21, 1933

1,936,379

UNITED STATES PATENT OFFICE 1,936,379

BEARING

Lachlan W. Child, Toledo, Ohio, assignor to Air-Way Electric Appliance Corporation, Toledo, Ohio, a corporation of Delaware Application March 2, 1932. Serial No. 596,252

3 Claims. (Cl. 308—132)

My invention relates to self aligning bearings and has for its object to provide a bearing which is both self aligning and is cushioned against the transmission of vibrations from a shaft journalled in the bearing to the bearing bracket or vice versa, and which is particularly adapted for use in connection with unit heaters or ventilators wherein silent operation is highly desirable.

Another object is to provide a bearing which is self aligning not only by pivotal movement but also by transverse translational movement of its axis.

Another object is to provide a bearing having the features mentioned and arranged for easy access to its parts for assembling, inspection and repair.

With these and other objects in view my invention consists in the combination and construction and arrangement of the various parts thereof, whereby the objects contemplated are attained, as more fully set forth in the accompanying specifications, pointed out in my claims, and illustrated in the accompanying drawing, in which:

Fig. 1 is a side elevation of a bearing involving my invention.

Fig. 2 is a vertical sectional view through the bearing.

Fig. 3 is a central sectional view through the upper portion of the bearing taken in the plane of the bearing axis.

Fig. 4 is a sectional view taken on the line 4—4 of Fig. 3.

Fig. 5 is a detail side elevation of the bearing bushing, and

Fig. 6 is a plan view of the bearing bracket.

I provide a bracket having a conventional base 9 terminating in ears 10 provided with openings 11 through which securing elements may be extended for securing the bracket to a supporting member. A standard 12, formed integrally with the base 9, projects upwardly therefrom and at its upper end is formed with a U shaped bushing case 13. The case 13 has a semi-cylindrical inner face 14 and a pair of end flanges 15 projecting radially inwardly and separated from the semi-cylindrical face 14 by depressed grooves 16. The face 14, flanges 15, and grooves 16 are projected vertically upwardly from the horizontal plane of the axis of the semi-cylindrical face 14 to a horizontal plane substantially tangent to the imaginary extension of the semi-cylindrical face 14, and thence terminated in the flat upper face 17 of the bushing case. A pair of ears 18 are formed one on either side of the bushing case, and are provided with threaded holes 19 to receive the screws 20 by means of which the cap plate 21 is secured to the bushing case.

In the standard 12 is a well 22 which communicates with the bushing case 13 at its upper end. A pair of troughs 23, depressed into the bushing case 13 in a vertical plane intersecting the axis of the bushing and bushing case, communicate with the well 22 to allow return of excess lubricant to the well from the grooves 16.

The bushing is shown in Fig. 5 and has an external diameter somewhat less than the diameter of the semi-cylindrical face 14 of the bushing case, and a length slightly greater than the distance between the remote edges of the two grooves 16 measured along the bushing axis. The bushing has a pair of grooves 24 of proper spacing and width to register with the grooves 16, and a flat upper face 25 designed to lie parallel to the cap plate 21.

A notch 26 is cut in one side of the bushing, intermediate the grooves 24, to a depth sufficient to establish communication with the bore or bore surface 27 of the bushing. The intersection of the notch 26 and the bore 27 forms the opening 28.

A pair of felt cushion rings 29 are interposed between the bushing and the bushing case 13, and are retained in the grooves 16-24 respectively. In assembling the device, the rings are first stretched over the ends of the bushings and laid into the grooves 24, and the bushing is thence slipped downwardly into the bushing case 13.

Prior to this assembly operation, a wick 30 is inserted into the well 22, and its end or ends drawn through the notch 26.

After the bushing has been lowered into place, the ends of the wick are folded across the flat top 25 of the bushing between the rings 29. The plate 21 is thence attached to the bushing case by means of the screws 20, and as the latter are drawn tight, the rings 29 and the wick portion or portions between the bushing and the cap plate 21 will be placed under compression.

The well 22 is filled through an oil cup 31 which is threaded into a boss 32 and a passage 33 affording communication between the oil cup 31 and the well 22.

I have discovered that the use of the felt rings produces a bearing which has a maximum deadening effect. I have also discovered that ordinary wool felt has sufficient strength and homogeneity of structure to support the bushing not only for upholding the weight of the shaft and its load, but also for resisting endwise movement of a fan hub or the like mounted on the shaft which is journalled in the bushing. Thus the bearing may be used not only as a simple bearing, but also as a thrust bearing. This is of some importance in connection with the mounting of a fan, for instance, since considerable end thrust is set up by any fan which moves air in a direction parallel to its axis of rotation.

An important feature of this invention is the mounting of a bushing within a case, with a free space separating the bushing from the case around the entire circumference of the bushing, and a ring of compressible material interposed between the two in said space, whereby the shaft may align itself not only by pivoting relative to the case, but is also capable of translational movement transversely of its axis. For instance, if it becomes necessary for aligning purposes, as it frequently will in organizations of the type under consideration, that the shaft axis actually move to one side of the axis of the case, such movement is attained by the compressing of the resilient ring on one side of the bushing. The ordinary self aligning bearing is capable only of pivotal movement about a point remaining fixed in the axis of the bearing case or bracket.

Attempts have been made to employ rubber as a cushioning medium in this mounting. But ordinary rubber will rot under the deteriorating influence of oil, and felt is found to be superior. I find that felt will last indefinitely in the arrangement described, without loss of efficiency in its functioning as a means of support between a bushing and a bushing bracket.

Lubricant is carried upwardly by capillary action through the wick 30 and to the opening 28 from which it seeps into the bushing, thence working its way upwardly to the ends of the bushing through the bearing bore 27. Excess oil will flow from the ends of the bushing to the troughs 23 and thence back into the well 22.

The cap plate 21, exerting pressure against the flat upper face 25 of the bushing through the medium of the wick 30 and the rings 29, serves to retain the bushing against rotation and thus the ends 26 will remain in proper vertical position to allow the most efficient feeding of the oil through the wick.

I claim as my invention:

1. In a bearing, a hollow standard forming a well, a bushing case formed in the upper end of said standard communicating with said well, and provided with a pair of internal annular grooves, a bushing provided with a pair of external annular grooves registering with said internal annular grooves and with an opening in its side communicating with its bore, a pair of rings of compressible material mounted in said grooves and serving as the means of support between said bushing and said bracket, and a wick in said well projecting into communication with said opening in the bushing, said well and said opening being positioned intermediate said grooves.

2. In a bearing, a hollow standard forming a well, an open mouth bushing case formed in the upper end of said standard and communicating with the well, a bushing having a flattened top surface and an aperture in its side wall portion mounted in said case, a resilient ring serving as a means of support between the bushing and said case, a cap secured to the case across said mouth and engaging said ring between its lower face and said flat bushing side, and a wick secured between said cap and the bushing and depending into the well, the depending portion of said wick communicating with the aperture in the bushing.

3. In a bearing, a hollow standard forming a well, an open mouth bushing case formed in the upper end of said standard and communicating with the well, a bushing having a flattened top surface and an aperture in its side wall portion mounted in said case, a resilient ring serving as a means of support between the bushing and said case, a cap secured to the case across said mouth and engaging said ring between its lower face and said flat bushing side, and a wick communicating with said aperture in the bushing and depending into the well.

LACHLAN W. CHILD.